(12) United States Patent
Jassim

(10) Patent No.: US 10,955,147 B1
(45) Date of Patent: Mar. 23, 2021

(54) SUPERSONIC CONDUIT SYSTEM AND METHOD FOR DEHUMIDIFYING AIR

(71) Applicant: Prince Mohammad Bin Fahd University, Dhahran (SA)

(72) Inventor: Esam Jassim, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 16/989,197

(22) Filed: Aug. 10, 2020

Related U.S. Application Data

(63) Continuation of application No. 16/774,650, filed on Jan. 28, 2020.

(51) Int. Cl.
*F24F 3/14* (2006.01)
*B01D 53/26* (2006.01)
*B01D 45/12* (2006.01)

(52) U.S. Cl.
CPC ............ *F24F 3/1405* (2013.01); *B01D 45/12* (2013.01); *B01D 53/265* (2013.01)

(58) Field of Classification Search
CPC ...... B01D 45/12; B01D 53/265; B01D 53/24; F24F 3/14; F24F 6/00; F24F 1/0358; F24F 2003/144
See application file for complete search history.

(56) References Cited

U.S. PATENT DOCUMENTS 6,331,195 B1 * 12/2001 Faust ..................... B04C 3/06
55/396
6,372,019 B1 4/2002 Alferov et al.

2002/0194988 A1 * 12/2002 Betting ................. B01D 45/16
95/29
2015/0354852 A1 * 12/2015 Liaw ......................... F24D 5/02
392/347
2015/0362198 A1 12/2015 Liaw et al.

FOREIGN PATENT DOCUMENTS

CN      104949231 A      9/2015
EP      0 162 509 A1     11/1985

OTHER PUBLICATIONS

Abdulrahem Alboainain, et al., "Design and Experimental Study on air-Dehumidification Performance using Supersonic Nozzle", Prince Mohammad Bin Fahd University, College of Engineering, Department of Mechanical Engineering, Senior Design Project Report, Spring 2017, 79 pages.

* cited by examiner

*Primary Examiner* — Elizabeth J Martin
(74) *Attorney, Agent, or Firm* — Oblon, McClelland, Maier & Neustadt, L.L.P.

(57) ABSTRACT

A system and method to dehumidify atmospheric air includes a convergent conduit, a separation unit, and a divergent conduit. A volume of humid atmospheric air enters the convergent conduit through an entry point of a convergent nozzle of the convergent conduit. A swirling process, which generates a centrifugal force, pushes a volume of water droplets towards an internal wall of the separation unit. In particular, the volume of water droplets is produced from the volume of humid atmospheric air. An annular channel of the separation unit is used to extract the volume of water droplets pushed to the internal wall of the separation unit. In particular, a drainage system which is in fluid communication with a transfer channel is used to extract the volume of water droplets from the system. A volume of dehumidified air, which is produced by removing water vapor, exits the system at the divergent conduit.

5 Claims, 10 Drawing Sheets

SECTION A-A

SECTION A-A

SUPERSONIC CONDUIT SYSTEM AND METHOD FOR DEHUMIDIFYING AIR

CROSS-REFERENCE TO RELATED APPLICATIONS

The present application is a Continuation of Ser. No. 16/774,650, pending, having a filing date of Jan. 28, 2020.

STATEMENT OF PRIOR DISCLOSURE BY THE INVENTORS

Aspects of the present disclosure are described in Esam I. Jassim, Geometrical Impaction of Supersonic Nozzle on the Dehumidification Performance during Gas Purification Process: an Experimental Study, Arabian Journal for Science and Engineering, Volume 44-Issue 2, Jun. 27, 2018, https://link.springer.com/article/10.1007/s13369-018-3340-x incorporated herein by reference in its entirety.

BACKGROUND

Field of the Invention

The present disclosure relates to a system and method of reducing humidity of atmospheric air by a vapor condensation process and extracting the condensed vapor through an extraction system. The present disclosure further relates to heating, ventilation, and air conditioning (HVAC) systems that integrate the system and method of the present disclosure to improve operational efficiency.

Description of the Related Art

Humidity is water vapor present in air. Water vapor, the gaseous state of water, is generally invisible to the human eye. Humidity, which is a measure of the amount of moisture present in air, indicates the likelihood for precipitation, dew, or fog. The amount of water vapor needed to achieve saturation increases as the temperature increases. As the temperature of a parcel of air decreases it will eventually reach the saturation point without adding or losing water mass. The amount of water vapor contained within a parcel of air can vary significantly.

Humidity has the potential to substantially increase the power consumption of conventional heating, ventilation, and air conditioning (HVAC) systems. One of the important functions of an air conditioning (AC) system is to remove excess humidity from the air. The process of removing excess humidity can take a toll on the air conditioning equipment and potentially affect its efficiency. Additionally, if the AC system is not properly sized for the area which is cooled, if the AC system is old, and if the AC system has not been properly maintained, the overall dehumidification may be impacted negatively.

The general approach to addressing dehumidification issues is to install a dehumidifier directly into the HVAC system or use a stand-alone dehumidifier that can manage the humidity level. Often a manual humidity level indicator is used in conventional systems. If a stand-alone dehumidifier is used, the humidity levels need to be monitored constantly.

In view of the drawbacks of the existing dehumidification processes and systems, the present disclosure describes a system and method that reduces the humidity of atmospheric air by about 30% by condensation. In order to do so, the system and method of the present disclosure describes a vapor condensation process and a method of effectively extracting the condensed vapor.

SUMMARY OF THE INVENTION

The present disclosure describes a system and a method that may be used to dehumidify atmospheric air through a vapor condensation process. An extraction process of the system and method described in the present disclosure extracts the condensed vapor effectively to improve the overall dehumidification process.

In order to perform the dehumidification process, the system of the present disclosure comprises a convergent conduit, a separation unit, and a divergent conduit. A volume of fresh and humid atmospheric air enters the convergent conduit, and passes through a convergent nozzle such that the overall pressure and the temperature of the volume of humid atmospheric air decreases resulting in vapor condensation. At the separation unit, condensed vapor is separated and extracted through a drainage system, wherein the condensed vapor is produced by a swirling process performed at the convergent conduit. After removing the condensed vapor from the volume of atmospheric air, a resulting volume of dehumidified air is transferred out of the system through the divergent conduit. At the divergent conduit, the volume of dehumidified air regains the pressure and the temperature the volume of humid atmospheric air had when entering the convergent conduit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

All illustrations of the drawings are for the purpose of describing selected embodiments of the present disclosure and are not intended to limit the scope of the present disclosure or accompanying claims.

The present disclosure describes a system and method that may be used to dehumidify atmospheric air using a vapor condensation process. Furthermore, the present disclosure describes an apparatus, system and method for extracting the condensed vapor such that the overall dehumidification process is improved compared to existing atmospheric air dehumidification processes.

The present disclosure describes an apparatus and process of dehumidifying atmospheric air, implementing the system of the present disclosure improves the overall efficiency of conventional HVAC systems. Additionally, the system and the method of the present disclosure may be implemented for dehumidification purposes in the aerospace industry and in the natural gas industry.

Figure 1:
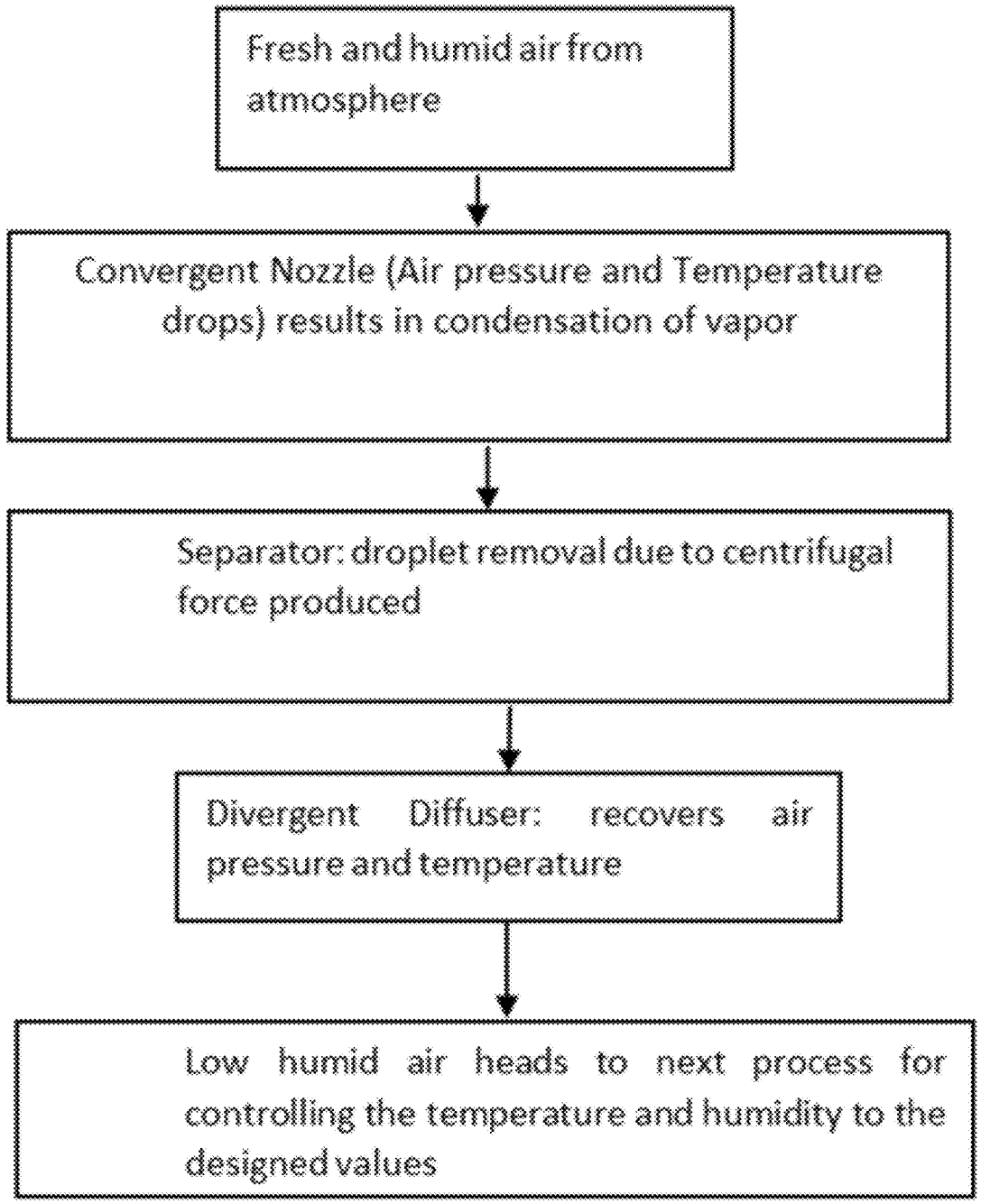
FIG. 1 is a flowchart illustrating the basic overall process of dehumidifying a volume of atmospheric air using the system and method of the present disclosure.
Figure 2:
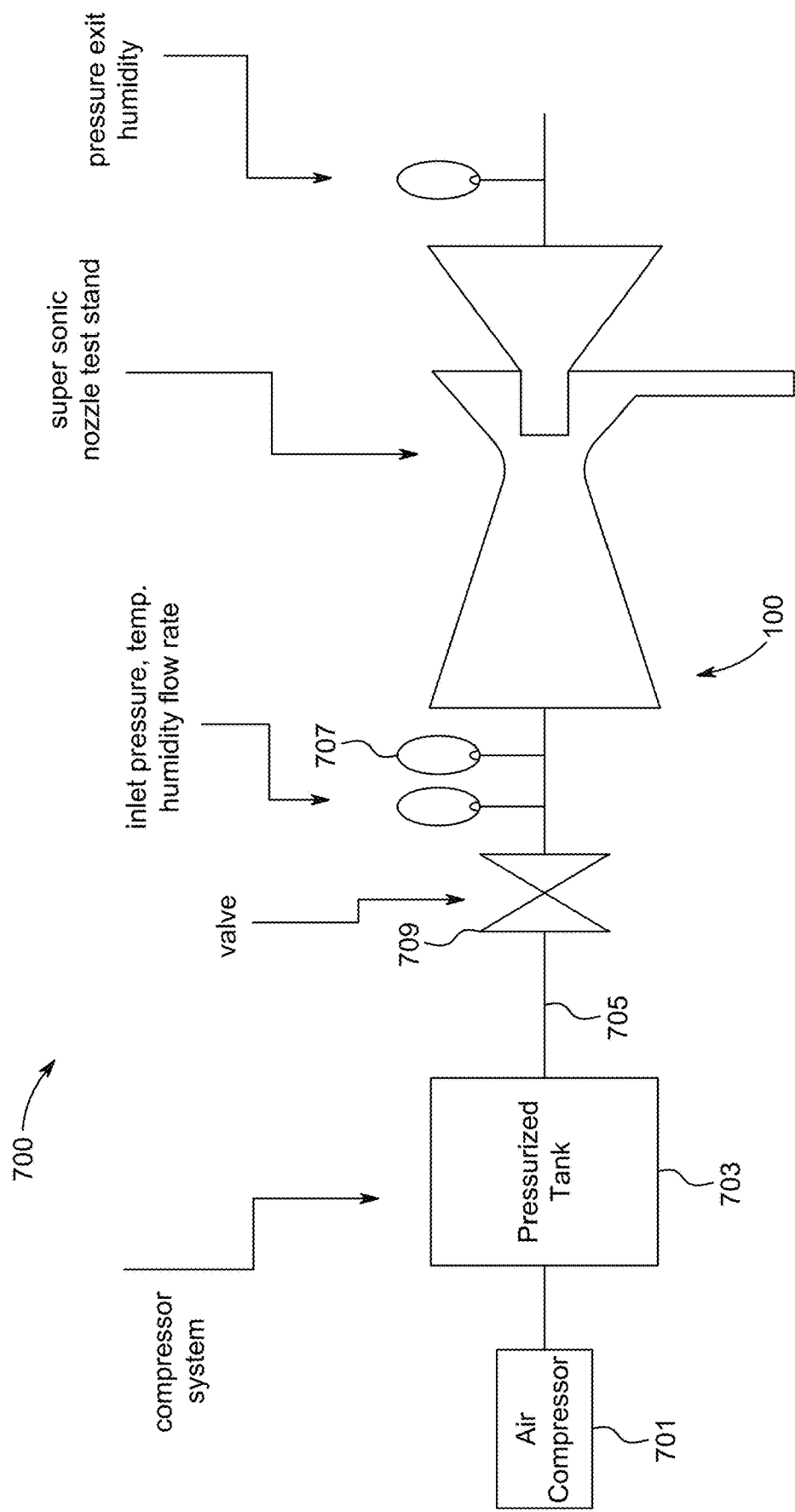
FIG. 2 is an illustration of the particle separation system used in the present disclosure.

The dehumidification process of the present disclosure is preferably implemented with a system described in the present disclosure comprising a convergent conduit 100, a separation unit 200, and a divergent conduit 300. As described in FIG. 1 and as shown in FIGS. 3A-3D, a volume of humid atmospheric air is received through the convergent conduit 100 which comprises a convergent nozzle 101. The volume of humid atmospheric air is preferably transferred to the convergent conduit 100 through an air compressor system 700, wherein the air compressor system comprises an air compressor 701 and a pressurized tank 703, which are used to provide humid air to the convergent conduit 100. As illustrated in FIG. 2, the air compressor system 700 further comprises a piping system 705, at least one pressure gauge 707, and at least one valve 709. The air compressor 701, the pressurized tank 703, and the at least one pressure gauge 707 are in fluid communication with each other through the piping system 705. The at least one valve 709 are integrated into the piping system 705 such that the overall flow of the volume of humid atmospheric air can be controlled using the at least one valve 709.

The air compressor 701 used in the system can be a reciprocating air compressor, a rotary screw air compressor, and a centrifugal air compressor. Reciprocating air compressors are considered positive displacement machines, which means they increase the pressure of the air by reducing its volume. Essentially, the machine takes in successive volumes of air which are confined into a closed space and elevating the air to a high pressure. A piston within a cylinder helps accomplishes this function. These types of air compressors are available as air-cooled or water-cooled in lubricated or non-lubricated configurations and are also provided in a number of different pressures and capacities.

Rotary screw compressors are positive displacement compressors. The most common rotary air compressor is the single stage helical or spiral lobe oil flooded screw air compressor. This type of air compressor consists of two rotors that are in a casing, and the rotors compress the air internally. These units are oil cooled, where the oil seals the internal clearances and have no valves.

The centrifugal air compressor is a dynamic compressor which is based on a transfer of energy from a rotating impeller to the air. The air compressor is designed for higher capacity because flow through the compressor is continuous. Centrifugal air compressors are oil free and the oil lubricated running gear is separated from the air by shaft seals and atmospheric vents.

When the volume of humid atmospheric air enters the convergent conduit 100 through an entry point of the convergent nozzle 101, which is a supersonic nozzle in a preferred embodiment, the volume of humid atmospheric air converges to a minimum area of the supersonic nozzle. Simultaneously, a primary pressure value and a primary temperature value of the volume of humid atmospheric air decreases resulting in a condensation of vapor within the convergent conduit 100. By using the supersonic nozzle as the convergent nozzle 101, kinetic energy may be converted into pressure such that the primary pressure value and the primary temperature may be recovered after dehumidification.

Standard temperature and pressure (STP) are used to define standard conditions for temperature and pressure, wherein standard temperature is equal to 0 Centigrade (° C.), which is 273.15 Kelvin (K). Standard Pressure is 1 atmosphere (Atm), 100 kilopascal (kPa) or 760 millimeters of mercury (mmHg). Normal temperature is 20° C. or 293.15 K or 68 Fahrenheit (° F.). Normal pressure is 1 atm or 101.325 kPa or 760 mmHg (or torr) or 14.6959 Pound-force per square inch (psi).

By volume, dry air contains about 78.09% nitrogen, 20.95% oxygen, 0.93% argon, 0.04% carbon dioxide, and small amounts of other gases. By volume, air also contains a variable amount of water vapor, on average around 1% at sea level, and 0.4% over the entire atmosphere. Humidity is the quantity of water vapor present in air, and can be expressed as an absolute, specific or relative value. Relative humidity (RH) depends on the temperature and the pressure of the system of interest. The same amount of water vapor results in higher relative humidity in cool air than warm air. A related parameter is the dew point. Relative humidity is usually expressed in percent and abbreviated by $\varphi$ or RH, wherein RH is the ratio of the partial pressure of water vapor to the equilibrium vapor pressure of water at a given temperature.

$$\varphi = p_w/p_{ws} 100\%$$

where
$\varphi$—relative humidity [%]
$p_w$—vapor partial pressure [bar]
$p_{ws}$—saturation vapor partial pressure at the actual dry bulb temperature is the vapor pressure at maximum content of water gas in air, before it starts to condense out as liquid water.

Relative humidity can also be expressed as the ratio of the vapor density of the air—to the saturation vapor density at the actual dry bulb temperature.

Relative humidity by density:

$$\varphi = \rho_w/\rho_{ws} 100\%$$

where:
$\varphi$=relative humidity [%]
$\rho_w$=vapor density [kg/m$^3$]
$\rho_{ws}$=vapor density at saturation at actual dry bulb temperature [kg/m$^3$]

Relative humidity can also be expressed as the ratio at actual mass of water vapor in a given air volume—to the mass of water vapor required to saturate at this volume.

Relative humidity can be expressed as:

$$\varphi = m_w/m_{ws} 100\%$$

where:
$\varphi$=relative humidity [%]
$m_w$=mass of water vapor in the given air volume [kg]
$m_{ws}$=mass of water vapor required to saturate at this volume [kg].

As described earlier, vapor condensation occurs when the volume of humid atmospheric air passes through the convergent nozzle 101, wherein the convergent nozzle 101 is a supersonic nozzle in a preferred embodiment. In general, a nozzle (from nose, meaning 'small spout') is a tube of varying cross-sectional area (usually axisymmetric) aiming at increasing the speed of an outflow, and controlling its direction and shape. Nozzle flow always generates forces associated to the change in flow momentum. A supersonic nozzle, also known as a convergent-divergent nozzle, is a tube that is pinched in the middle making a carefully balanced, asymmetric hourglass shape. Supersonic nozzles are used to accelerate a pressurized gas to a higher supersonic speed in the axial (thrust) direction, by converting the heat energy of the flow into kinetic energy. In particular, in a convergent-divergent nozzle, the gas converges to a minimum area, or throat, of the supersonic nozzle. A converging nozzle can only become supersonic at the exit stage; the speed increases monotonically along the nozzle. If a converging nozzle is fed from a constant pressure constant temperature chamber, the flow rate grows as the discharge pressure is being reduced, until the flow becomes sonic (choked) and the flow rate no longer changes with further decreasing in discharge-pressure (a set of expansion waves adjust the exit pressure to this lower discharge pressure). Preferably, the supersonic nozzle is made of stainless steel. However, other material that may be, but is not limited to, brass may be used in other embodiments of the present disclosure. In other embodiments, carbon or silica may be used in manufacturing portions of the supersonic nozzle.

As a subsequent step in the dehumidification process, the volume of humid atmospheric air with increased kinetic energy is transferred to the separation unit 200. To separate the condensed vapor from the volume of humid atmospheric air with increased kinetic energy at the separation unit 200, a centrifugal force is applied. Centrifugal force is an outward force apparent in a rotating reference frame, wherein a rotating frame of reference is a special case of a non-inertial reference frame that is rotating relative to an inertial reference frame. The centrifugal force is directed away from an axis passing through the origin of a coordinate system and parallel to the axis of rotation. The centrifugal force can also be defined as a fictitious force peculiar to a particle moving on a circular path that has the same magnitude and dimensions as the force that keeps the particle on its circular path (the centripetal force) but points in the opposite direction. In the system and method of the present disclosure, the centrifugal force separates a volume of water droplets from the volume of humid atmospheric air with increased kinetic energy to produce a volume of dehumidified air, wherein the volume of water droplets is a result of the condensed vapor that is produced when the temperature of the volume of humid atmospheric air decreases within the convergent conduit. In a preferred embodiment, the centrifugal force is applied through a swirling process that results in the volume of droplets being pushed towards an internal wall of the separation unit 200. The method used for the swirling process, which results in the centrifugal force, can vary in different embodiments. The swirling process may be performed using vanes in one embodiment of the present disclosure. For example, a vane ring may be positioned at the entry point of the convergent nozzle 101 (see 101-v in FIG. 3B). In another embodiment, blades may be used to perform the swirling process. In a different embodiment, a cyclone chamber may be used to perform the swirling process. In other embodiments, the swirling process may be performed using tangential injectors and short helical inserts. The humid air preferably enters the convergent portion of the device at a 45 deg tangent angle to provide initial circulation and helical motion inside the system. Such motion stimulates the centrifugal force that pushes the droplets away towards the surface of the system and the drainage.

In a preferred embodiment, a minimum value of the centrifugal force is within a range of 8000×gravity (g)-15,000×g, 9000×g-12,000×g, with a preferable minimum centrifugal force of about 10,000×g, wherein g=9.81 meters/second$^2$(m/s$^2$). During operation, the centrifugal force can be, but is not limited to, a value within a range of 500,000× g-750,000×g. As a result of using both the supersonic nozzle and the swirling process, the volume of humid atmospheric air with increased kinetic energy passes through the convergent nozzle 101 at a velocity within a range of 300 meters/second (m/s)-600 m/s, 350 m/s-550 m/s, with a preferable velocity of about 400 m/s.

The volume of water droplets, which is separated from the volume of humid atmospheric air with increased kinetic energy, is extracted from the system of the present disclosure using a drainage system 500 which is in fluid communication with the convergent conduit 100, the separation unit 200, and the divergent conduit 300.

Figure 3A:
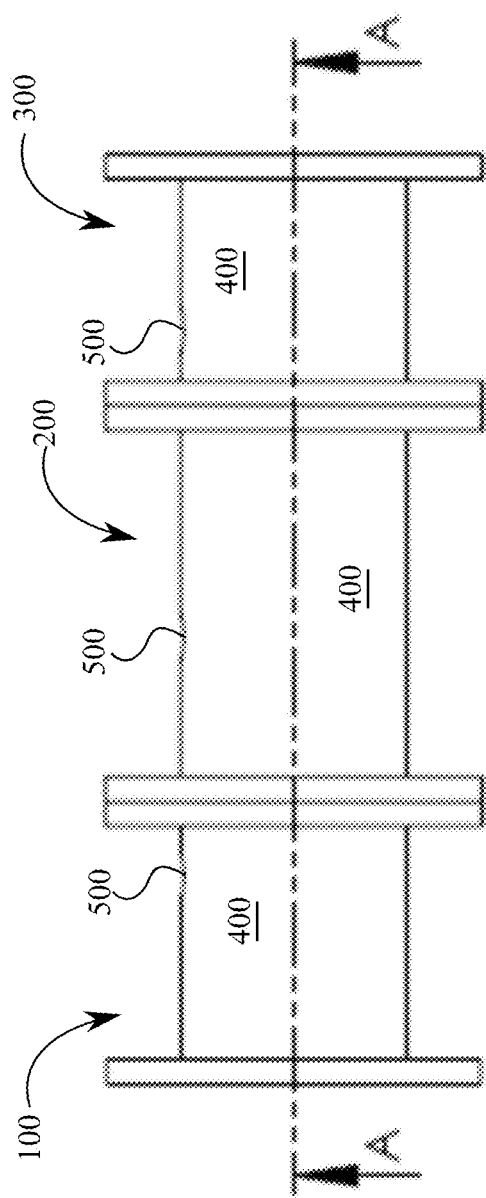
FIG. 3A is a side view of the system described in the present disclosure.
Figure 3B:
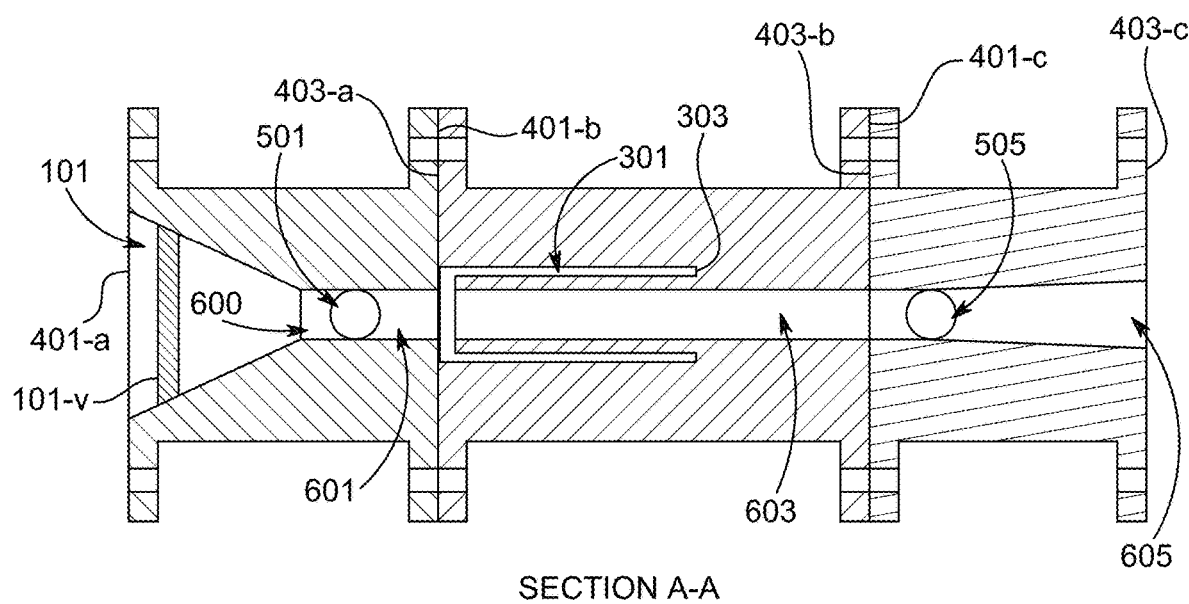
FIG. 3B is a cross-sectional top view of the system described in the present disclosure.
Figure 3C:
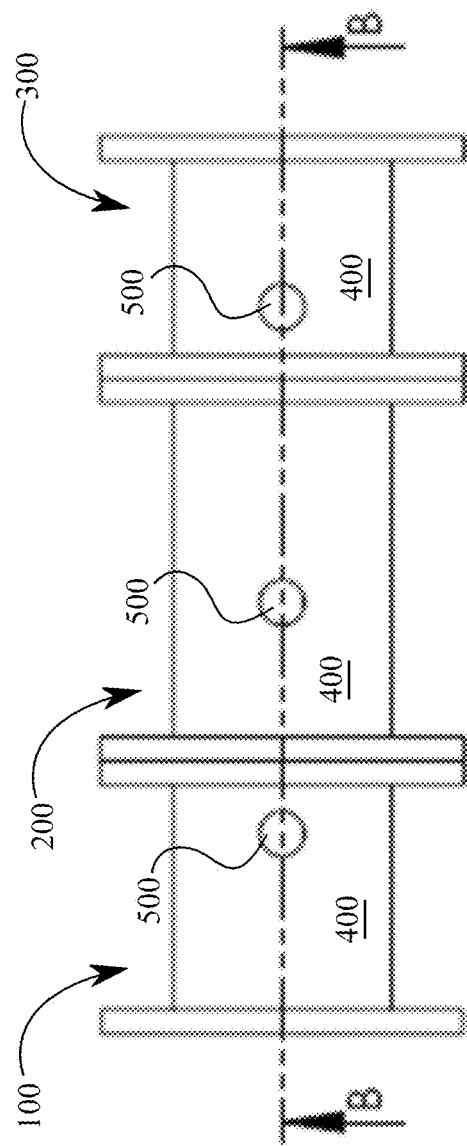
FIG. 3C is a top view of the system described in the present disclosure.
Figure 3D:
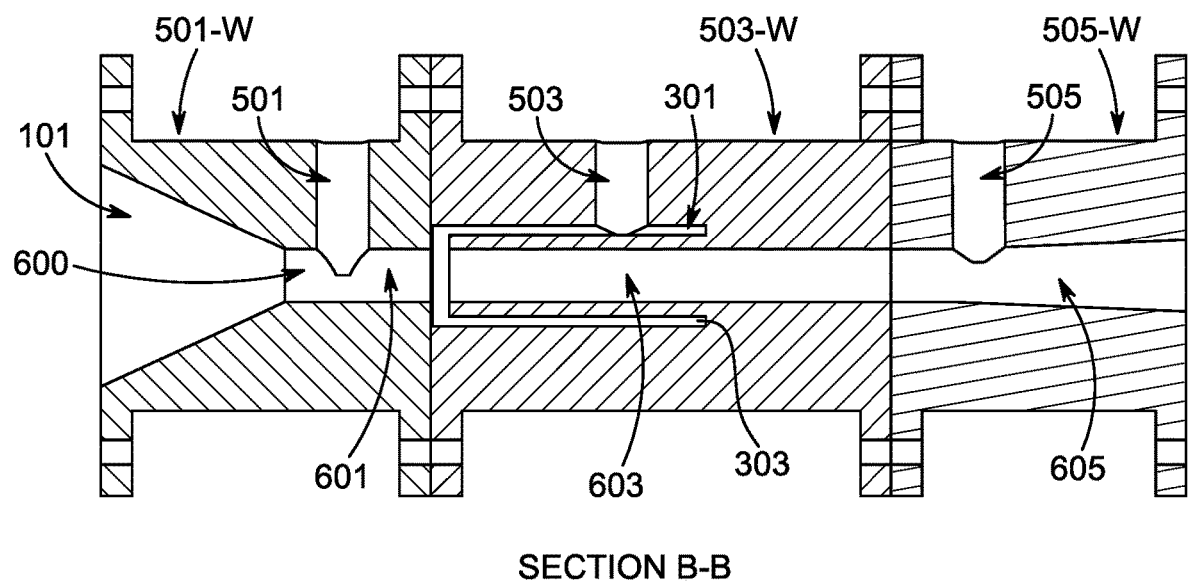
FIG. 3D is a cross-sectional side view of the system described in the present disclosure.
Figure 4:
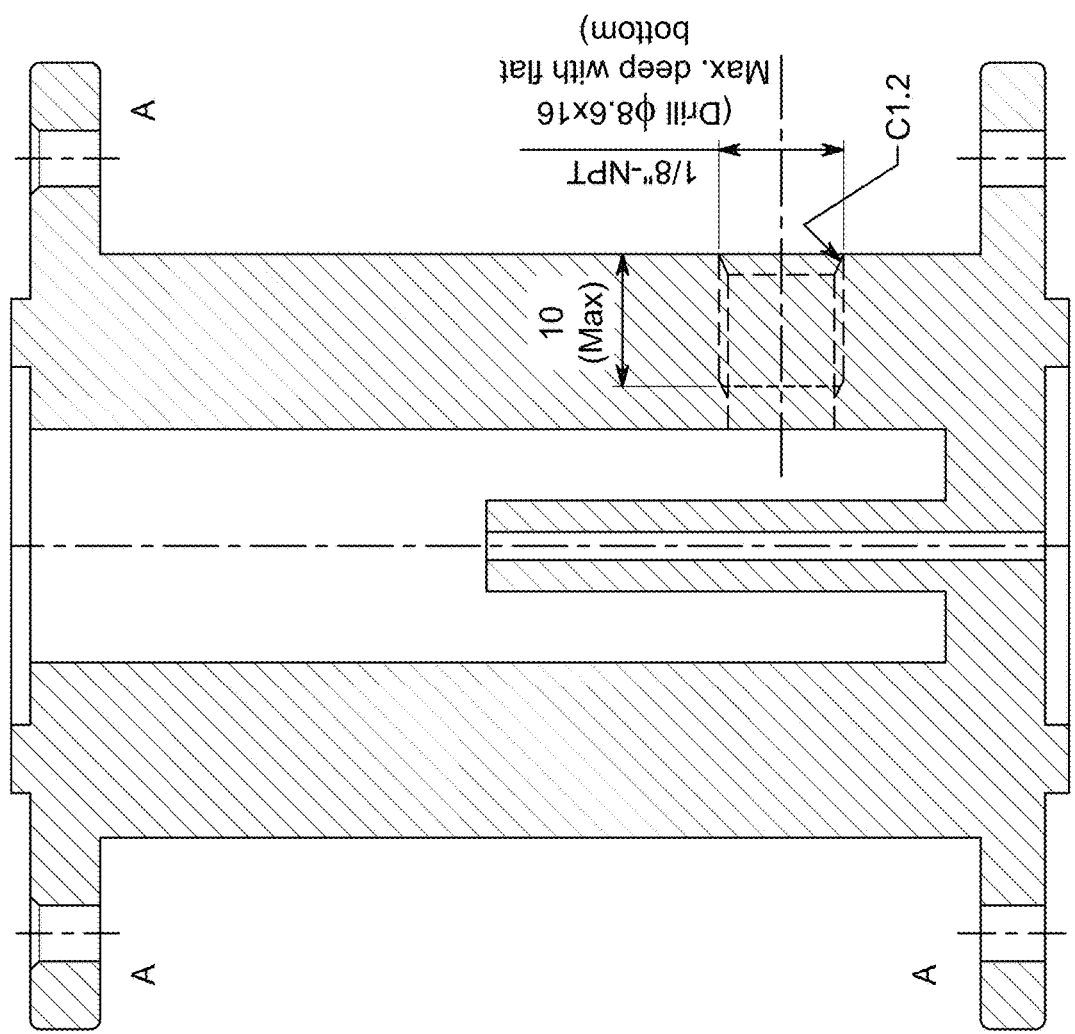
FIG. 4 is a cross-sectional side view of the separation unit used in the system of the present disclosure.
Figure 5A:
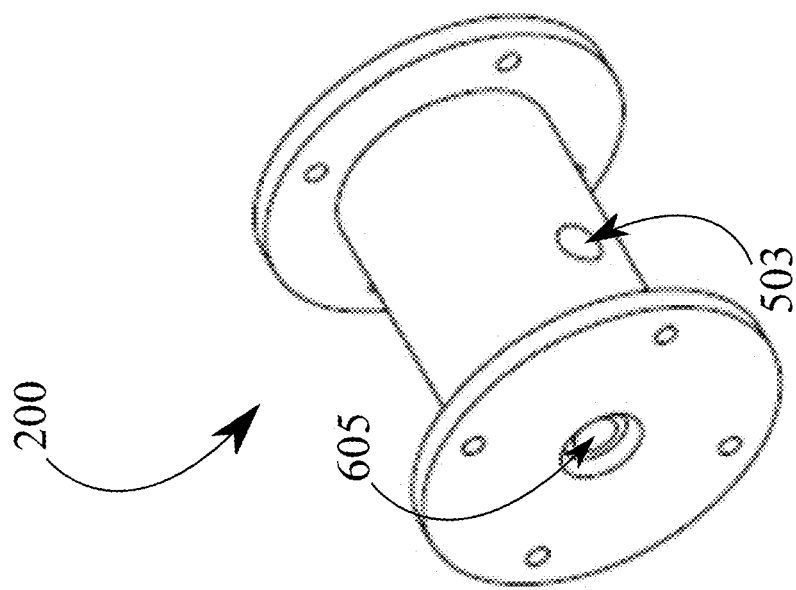
FIG. 5A is a perspective view of the separation unit used in the system of the present disclosure.
Figure 5B:
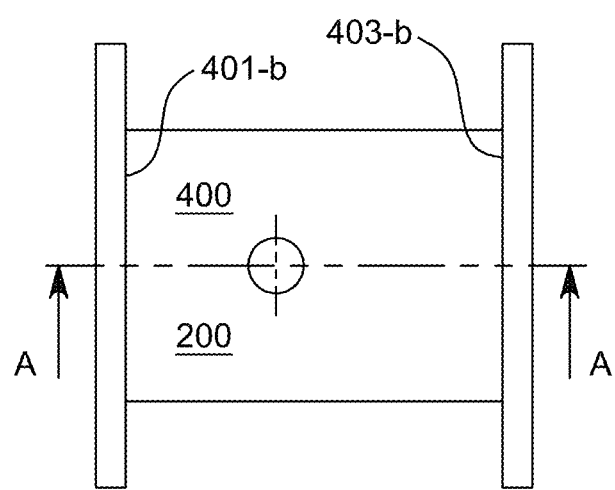
FIG. 5B is a top view of the separation unit used in the system of the present disclosure.
Figure 5C:
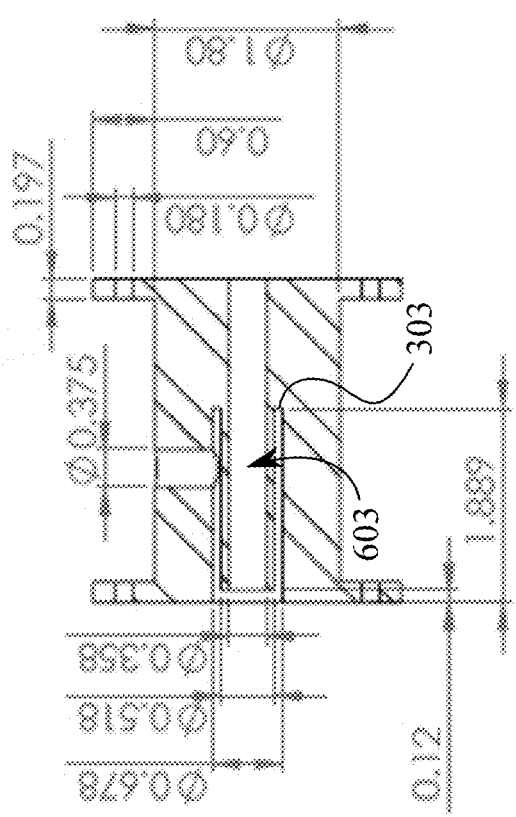
FIG. 5C is a cross-sectional side view of the separation unit used in the system of the present disclosure.

As seen in FIG. 3C and FIG. 3D, to do so, the drainage system 500 comprises a first drain channel 501 passing through a wall (503-W) of the convergent conduit, a second drain channel 503 passing through a wall (501-W) of the separation unit, and a third drain channel 505 passing through a wall (505-W) of the divergent conduit. The first drain channel 501 is in fluid communication with the convergent conduit 100, the second drain channel 503 is in fluid communication with the separation unit 200, and the third drain channel 505 is in fluid communication with the divergent conduit 300.

When the volume of water droplets is extracted using the drainage system 500, the volume of dehumidified air is directed to the divergent conduit 300 allowing the volume of dehumidified air to be transferred out of an exit point of the divergent conduit 300. Upon exiting the divergent conduit 300, the volume of dehumidified air returns to the primary pressure value and the primary temperature. In particular, the volume of dehumidified air regathers pressure and increases temperature to match or substantially match the primary pressure value and the primary temperature of the volume of humid atmospheric air. In a preferred embodiment, a humidity level difference between the volume of humid atmospheric air and the volume of dehumidified air is within a range of 25%-35%, 28%-32% with a preferred value of about 30%. The reduction in humidity is a measure of the water content in the air, e.g., a humidity ratio. The instrument used for measurement of humidity is a relative humidity device.

As seen in FIGS. 3A-3D, to perform the dehumidification process, the convergent conduit 100, the separation unit 200, and the divergent conduit 300 are positioned adjacent to each other and are configured to form a transfer channel 600. The separation unit 200 is positioned in between the convergent conduit 100 and the divergent conduit 300 such that the volume of humid atmospheric air enters the transfer channel 600 at the convergent conduit 100 and exits the transfer channel 600 from the divergent conduit 300 as the volume of dehumidified air since the volume of water droplets is separated at the separation unit 200. Since three independent sections, namely the convergent conduit 100, the separation unit 200, and the divergent conduit 300 are used to make up the transfer channel 600, the transfer channel 600 comprises a first channel portion 601, a second channel portion 603, and a third channel portion 605. The first channel portion 601 centrally traverses through a structural body 400 of the convergent conduit 100. The second channel portion 603 centrally traverses through a structural body 400 of the separation unit 200. The third channel portion 605 centrally traverses through a structural body 400 of the divergent conduit 300. Thus, as described earlier, when the convergent conduit 100, the separation unit 200, and the divergent conduit 300 are positioned adjacent to each other, the transfer channel 600 can be configured by concentrically aligning the first channel portion 601, the second channel portion 603, and the third channel portion 605.

An attachment mechanism which can be, but not limited to, a plurality of screws and a first plurality of screw receiving holes, a second plurality of screw receiving holes, and a third plurality of screw receiving holes may be used to attach the convergent conduit 100, the separation unit 200, and the divergent conduit 300 to each other. A diameter of each of the screw receiving holes can be within a range of 0.16 mm-0.2 mm, 0.17 mm-0.19 mm, with a preferable diameter of about 0.18 mm. Preferably, the convergent conduit 100, the separation unit 200, and the divergent conduit 300 will each comprise a flange section that extends outward from the structural body 400 at the first end 401-a, 401-b and 401-c, respectively, and also at the second end 403-a, 403-b and 403-c, respectively. The flange section will preferably have a thickness within a range of 0.17 mm-0.20 mm, 0.18 mm-0.2 mm, with a preferable thickness of about 0.19 mm. The first plurality of screw receiving holes will traverse through the flange section at the first end 401-a and the second end 403-a of the structural body 400 of the convergent conduit 100. The second plurality of screw receiving holes will traverse through the flange section at the first end 401-b and the second end 403-b of the structural body 400 of the separation unit 200. The third plurality of screw receiving holes will traverse through the flange section at the first end 401-c and the second end 403-c of the structural body 400 of the divergent conduit 300. The first plurality of screw receiving holes, the second plurality of screw receiving holes, and the third plurality of screw receiving holes are concentrically aligned to each other such that the plurality of screws can be used to attach the convergent conduit 100, the separation unit 200, and the divergent conduit 300 to each other.

As described earlier, the drainage system 500 is used to extract the volume of water droplets produced during the dehumidification process. A first drain channel 501, a second drain channel 503, and a third drain channel 505 of the drainage system 500 are in fluid communication with the transfer channel 600. In particular, the first drain channel 501 is in fluid communication with the first channel portion 601, wherein the first drain channel 501 perpendicularly extends to the first transfer channel 600. Likewise, the second drain channel 503 is in fluid communication with the second channel portion 603, wherein the second drain channel 503 perpendicularly extends to the second transfer channel 600. Similarly, the third drain channel 505 is in fluid communication with the third channel portion 605, wherein the third drain channel 505 perpendicularly extends to the third transfer channel 600.

In a preferred embodiment, the first drain channel 501, the second drain channel 503, and the third drain channel 505 will have a diameter within a range of 0.3 mm-0.45 mm, 0.325 mm-0.4 mm, with a preferable diameter of about 0.375 mm.

As described earlier, the convergent conduit 100 comprises a convergent nozzle 101, which is a supersonic nozzle, and a structural body 400, wherein the first channel portion 601 traverses through the structural body 400. The convergent nozzle 101 is integrated into the structural body 400 of the convergent conduit 100 such that an entry point of the convergent nozzle 101 is positioned at a first end 401-a of the structural body 400. A throat portion of the convergent nozzle 101 is positioned in between the first end 401-a and a second end 403-a of the structural body 400 of the convergent conduit 100, wherein the structural body 400 of the convergent conduit 100 extends from the first end 401-a to the second end 403-a. For the volume of humid atmospheric air to enter from the entry point of the convergent nozzle 101 and pass through the first channel portion, the convergent nozzle 101 and the first channel portion 601, which extends from the first end 401-a to the second end 403-a, are concentrically aligned to each other.

At the separation unit 200, shown in FIG. 4 and FIGS. 5A-5C, the volume of water droplets separated from the volume of humid atmospheric air is pushed towards the inner wall of the separation unit 200, and the volume of water droplets is subsequently extracted through the drainage system 500. To do so, the separation unit 200 comprises an annular channel 301 and a structural body 400. The annular channel 301 is configured to receive the volume of water droplets that is pushed towards the inner wall of the separation unit 200. Since the separation unit 200 is positioned adjacent the convergent conduit 100, a first end 401-b of the separation unit 200 is positioned against the second end 403-a of the convergent conduit 100. Similar to the first channel portion 601, the second channel portion 603 also extends from the first end 401-b to a second end 403-b of the structural body 400 of the separation unit 200. The annular channel 301 extends from the first end 401-a such that a terminal end 303 of the annular channel 301 is positioned in between the first end 401-b and the second end 403-b of the structural body 400 of the separation unit 200. More specifically, in a preferred embodiment, a distance from the first end 401-b of the structural body 400 to the terminal end 303 of the annular channel 301 is within a range of 1.5 mm-2.0 mm, 1.7 mm-2.00 mm, with a preferable distance of about 1.9 mm. For the annular channel 301 to receive the volume of water droplets, a diameter of the annular channel 301 is greater than a diameter of the second channel portion 603 which traverses the structural body 400 of the separation unit 200. Furthermore, the annular channel 301 is in fluid communication with the second channel portion 603 to receive the volume of water droplets. Therefore, the volume of water droplets that is pushed towards the inner wall moves into the annular channel 301.

The annular channel 301 can have an outer diameter within a range of 0.5 millimeters (mm)-1.0 mm, 0.6 mm-0.9 mm, with a preferable outer diameter of about 0.6 mm. Moreover, the annular channel 301 can have an internal diameter within a range of 0.4 mm-0.8 mm, 0.4 mm-0.7 mm, with a preferable inner diameter of about 0.5 mm. In comparison, the second channel portion 603 may have a diameter within a range of 0.3 mm-0.4 mm, 0.325 mm-0.375 mm, with a preferable diameter of about 0.36 mm. To effectively extract the volume of water droplets from the second channel portion 603, and maintain fluid communication with the second channel portion 603, the annular channel 301 is configured to maintain a merging section with the second channel portion 603, wherein the merging section may have a width within a range of 0.075 mm-0.2 mm, with a preferable width of about 0.1 mm.

The volume of dehumidified air exits the system of the present disclosure from the divergent conduit 300 via the third channel portion 605 that centrally traverses through a structural body 400 of the divergent conduit 300, wherein a first end 401-c of the structural body 400 of the divergent conduit 300 is positioned against a second end 403-c of the structural body 400 of the separation unit 200.

The third channel portion 605 is designed to have a smaller diameter at the first end 401-c and a larger diameter at the second end 403-c. An inlet at the first end 401-c is preferably within a range of 1 mm-3 mm, 1.5 mm-2.5 mm, with a preferable diameter of about 2 mm. On the other hand, an outlet at the second is preferably within a range of 12 mm-15 mm, 13 mm-15 mm, with a preferable diameter of 14 mm.

The distance from the first end 401-c to the second end 403-c may also vary in different embodiments of the present invention. For example, the length from the first end 401-c to the second end 403-c can be 50 mm in one embodiment. In another embodiment, the length from the first end 401-c to the second end 403-c can be 70 mm. In a different embodiment, the length from the first end 401-c to the second end 403-c can be 90 mm.

A diffusing angle at which the volume of dehumidified air exits the divergent conduit 300 varies according to the length of the structural body 400 of the convergent conduit 100 and the diameters of the inlet and the outlet. The diffusing angle can be determined using the following equation:

$$\tan\theta = \frac{D_1}{x} = \frac{D_2}{L+x}$$

$$\frac{D_1}{D_2} = \frac{x}{L+x}$$

$$\tan\theta = \frac{D_1}{\frac{D_1 \times L}{D_2 - D_1}} = \frac{D_2 - D_1}{L}$$

where:
$D_1$—Inlet diameter;
$D_2$—Outlet diameter;
L—length of the structural body of the divergent conduit from the first end to the second end;
θ—Diffusing angle;
x—distance from a vertex to an inlet diameter measuring point;

For example, when the length of the structural body 400 is 50 mm and the inlet diameter is 2 mm and the outlet diameter 14 mm, the diffusing angle is within a range of 5 degrees (°)-10°, with a preferable angle of about 6°. In a different embodiment, when the length of the structural body 400 is 70 mm and the inlet diameter is 2 mm and the outlet diameter 14 mm, the diffusing angle is within a range of 3°-8°, 3°-6° with a preferable angle of about 5°. In another embodiment, when the length of the structural body 400 is 90 mm and the inlet diameter is 2 mm and the outlet diameter 14 mm, the diffusing angle is within a range of 3°-6°, 3°-5°, with a preferable angle of about 4°.

Terminology used herein is for the purpose of describing particular embodiments only and is not intended to be limiting of the invention.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein. The phrase "substantially" may be used when describing power consumption in HVAC systems and when describing pressure and temperature values relating to the convergent conduit and the divergent conduit.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As referred to herein, all compositional percentages are by volume percentage of the total composition, unless otherwise specified.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

Obviously, numerous modifications and variations of the present invention are possible in light of the above teachings. It is therefore to be understood that within the scope of the appended claims, the invention may be practiced otherwise than as specifically described herein.

The invention claimed is:

1. A supersonic conduit system for dehumidifying atmospheric air, comprising:
a convergent conduit, a separation unit, and a divergent conduit, wherein each of the convergent conduit, the separation unit, and the divergent conduit are hollow flanged tubular sections having lengthwise axial cavities and are configured to fasten together and concentrically align to form the supersonic conduit system in the form of a tubular conduit body having an axial transfer channel,
wherein the convergent conduit has a converging section of decreasing diameter in the axial direction and a transfer section of uniform diameter in the axial direction that are of substantially the same axial length, the convergent conduit further comprising a vane ring at an entry point of the convergent conduit,
wherein each of the convergent conduit, the separation unit and the divergent conduit includes a drain channel passing through a wall of the respective hollow flanged tubular section perpendicularly to the axial transfer channel and fluidly connected to the axial transfer channel, wherein the drain channels are disposed between an upstream end and a downstream end of the hollow flanged tubular sections and form a drainage system,
wherein the drain channel of the separation unit is in fluid connection with an annular channel passing from an upstream end of the separation unit axially along the axial transfer channel to the drain channel;
wherein the convergent conduit is configured to decrease a primary pressure value and a primary temperature value of a volume of humid atmospheric air and to increase the kinetic energy of the volume of humid atmospheric air passing through the convergent conduit,
wherein the convergent conduit is directly adjacent to the separation unit which is directly adjacent to the divergent conduit.

2. A method of dehumidifying atmospheric air by vapor condensation, comprising:
passing, through the convergent conduit of the supersonic conduit system of claim 1, the volume of humid atmospheric air, wherein the volume of humid atmospheric air is received at the convergent conduit as an entry point of the supersonic conduit system, passes through the separation unit then exits the supersonic conduit system through the divergent conduit, wherein passing through the convergent conduit decreases a primary pressure value and a primary temperature of the volume of humid atmospheric air at the entry point of the conduit system and increases the kinetic energy of the volume of humid atmospheric air,
wherein the volume of humid atmospheric air swirls by contacting the vane ring as it passes through the supersonic conduit system,
wherein water vapor present in the volume of humid atmospheric air condenses to form water droplets while the volume of humid atmospheric air passes through the convergent conduit; then
separating the water droplets from the volume of humid atmospheric air in the separation unit by passing the water droplets into the drainage system in fluid communication with the convergent conduit, the separation unit, and the divergent conduit to produce a volume of dehumidified air; and
passing the volume of dehumidified air through an exit point of the supersonic conduit system, wherein the volume of dehumidified air, after passing through the divergent conduit, has a primary pressure value and a primary temperature that are substantially the same as the primary pressure value and the primary temperature of the volume of humid atmospheric air at the entry point of the supersonic conduit system.

3. The method of dehumidifying atmospheric air of claim 2, wherein a humidity level of the volume of dehumidified air is 25%-35% of the humidity of the volume of humid atmospheric air.

4. The system of claim 1, wherein an outer diameter of the annular channel is within a range of 0.5 mm-1.0 mm.

5. The system of claim 1, wherein an inner diameter of the annular channel is within a range of 0.4 mm-0.8 mm.

* * * * *